(12) United States Patent
Cho

(10) Patent No.: US 9,625,942 B2
(45) Date of Patent: Apr. 18, 2017

(54) DISPLAY PANEL, METHOD FOR DESIGNING DISPLAY PANEL AND RECORDING MEDIUM THEREOF

(71) Applicant: SAMSUNG ELECTRONICS CO., LTD., Suwon-si (KR)

(72) Inventor: Young-gwi Cho, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/699,629

(22) Filed: Apr. 29, 2015

(65) Prior Publication Data

US 2015/0316957 A1 Nov. 5, 2015

(30) Foreign Application Priority Data

Apr. 30, 2014 (KR) ........................ 10-2014-0052500

(51) Int. Cl.
| | |
|---|---|
| *G06F 1/16* | (2006.01) |
| *G06F 3/01* | (2006.01) |
| *G09G 3/00* | (2006.01) |
| *H04N 5/64* | (2006.01) |

(52) U.S. Cl.
CPC .......... *G06F 1/1601* (2013.01); *G06F 1/1652* (2013.01); *G06F 3/013* (2013.01); *G09G 3/003* (2013.01); *G09G 2320/0693* (2013.01); *G09G 2380/02* (2013.01); *H04N 5/64* (2013.01)

(58) Field of Classification Search
CPC .......... G06F 1/1601; G06F 1/16; G06F 3/013; G06F 1/133305; G06F 1/133308; G06F 1/133603; H05K 7/00; F16M 11/04

USPC .................................. 345/204–214, 690–699
See application file for complete search history.

(56) References Cited

U.S. PATENT DOCUMENTS

| | | |
|---|---|---|
| 6,926,412 B2 | 8/2005 | Kim et al. |
| 8,493,535 B2 | 7/2013 | Enomoto |
| 8,582,065 B1 | 11/2013 | Enomoto |
| 9,081,540 B1 * | 7/2015 | Cho et al. |

(Continued)

FOREIGN PATENT DOCUMENTS

| | | |
|---|---|---|
| CN | 102057317 A | 5/2011 |
| CN | 103247235 A | 8/2013 |

(Continued)

OTHER PUBLICATIONS

Communication dated Jun. 4, 2015, issued by the Korean Intellectual Property Office in counterpart Korean Application No. 10-2014-0052500.

(Continued)

*Primary Examiner* — Dmitriy Bolotin
(74) *Attorney, Agent, or Firm* — Sughrue Mion, PLLC

(57) ABSTRACT

A method for designing a display panel. The method includes calculating, for each of a plurality of viewing locations, a difference value between a right side viewing angle of that viewing location and a left side viewing angle of that viewing location, the calculating is performed for each of a plurality of curvatures, and setting, from among the plurality of curvatures, a curvature of the curved display panel based on the difference values. Accordingly, a curved display panel which enlarges a viewing angle of a viewer than a flat display panel, increases an immersion, and decreases a distortion of a viewing angle may be realized.

20 Claims, 33 Drawing Sheets

(56) References Cited

U.S. PATENT DOCUMENTS

| | | | |
|---|---|---|---|
| 9,113,533 B2 | 8/2015 | Kmetec et al. | |
| 9,390,642 B2 | 7/2016 | Kim et al. | |
| 2007/0103776 A1 | 5/2007 | Cok et al. | |
| 2007/0139605 A1* | 6/2007 | Matsuda et al. | 349/158 |
| 2011/0102721 A1 | 5/2011 | Enomoto | |
| 2012/0235893 A1* | 9/2012 | Phillips et al. | 345/156 |
| 2013/0207946 A1 | 8/2013 | Kim et al. | |
| 2013/0266771 A1* | 10/2013 | Kusano et al. | 428/174 |
| 2013/0278873 A1 | 10/2013 | Enomoto | |
| 2013/0321740 A1* | 12/2013 | An et al. | 349/58 |
| 2014/0179191 A1* | 6/2014 | Ko | 445/24 |
| 2014/0354519 A1* | 12/2014 | Lee et al. | 345/76 |
| 2015/0035812 A1* | 2/2015 | Shin et al. | 345/204 |
| 2015/0043136 A1* | 2/2015 | Kim et al. | 361/679.01 |
| 2015/0092361 A1* | 4/2015 | Cho et al. | 361/749 |
| 2015/0346542 A1 | 12/2015 | An et al. | |

FOREIGN PATENT DOCUMENTS

| | | |
|---|---|---|
| CN | 203118369 U | 8/2013 |
| CN | 103424913 A | 12/2013 |
| EP | 2500894 A1 | 9/2012 |
| JP | 2013242525 A | 12/2013 |
| KR | 10-0516173 B1 | 9/2005 |
| KR | 20-2008-0006708 U | 12/2008 |
| KR | 10-2013-0113826 A | 10/2013 |
| KR | 10-2013-0117110 A | 10/2013 |
| KR | 1020140019058 A | 2/2014 |

OTHER PUBLICATIONS

Communication dated Jul. 14, 2015, issued by the European Patent Office in counterpart European Application No. 15165770.7.
Communication dated Aug. 4, 2015, issued by the European Patent Office in counterpart European Application No. 15165770.7.
Communication dated Aug. 11, 2015, issued by the International Searching Authority in counterpart International Application No. PCT/KR2015/004252.
Communication dated Mar. 30, 2016, issued by the European Patent Office in counterpart European Application No. 15165770.7.
Communication dated Jul. 20, 2016, issued by the State Intellectual Property Office of P. R. China in counterpart Chinese Patent Application No. 201511000539.8.
Communication dated Feb. 3, 2017, issued by the State Intellectual Property Office of P. R. China in counterpart Chinese Application No. 201510218058.8.
Communication dated Feb. 10, 2017, issued by the European Patent Office in counterpart European Application No. 15165770.7.

* cited by examiner

FIG. 4

| H | A | D | R | α | d | h | ② 420 | ① 410 | Deviation 430 |
|---|---|---|---|---|---|---|---|---|---|
| 1218.1 | 56 | 1000.0 | 3000 | 23.3 | 61.6 | 1209.7 | 55 | 54 | 1 |
| 1218.1 | 45 | 1500.0 | 3000 | 23.3 | 61.6 | 1209.7 | 44 | 44 | 0 |
| 1218.1 | 37 | 2000.0 | 3000 | 23.3 | 61.6 | 1209.7 | 36 | 36 | 1 |
| 1218.1 | 31 | 2500.0 | 3000 | 23.3 | 61.6 | 1209.7 | 32 | 29 | 3 |
| 1218.1 | 27 | 3000.0 | 3000 | 23.3 | 61.6 | 1209.7 | 29 | 24 | 5 |
| 1218.1 | 23 | 3500.0 | 3000 | 23.3 | 61.6 | 1209.7 | 26 | 20 | 6 |
| 1218.1 | 21 | 4000.0 | 3000 | 23.3 | 61.6 | 1209.7 | 24 | 16 | 8 |
| 1218.1 | 18 | 4500.0 | 3000 | 23.3 | 61.6 | 1209.7 | 23 | 14 | 9 |
| 1218.1 | 17 | 5000.0 | 3000 | 23.3 | 61.6 | 1209.7 | 22 | 11 | 10 |
| 1218.1 | 15 | 5500.0 | 3000 | 23.3 | 61.6 | 1209.7 | 21 | 10 | 11 |
| 1218.1 | 14 | 6000.0 | 3000 | 23.3 | 61.6 | 1209.7 | 20 | 8 | 12 |

FIG. 5

| H | A | D | R | α | d | h | ② 420 | ① 410 | Deviation 430 |
|---|---|---|---|---|---|---|---|---|---|
| 1218.1 | 56 | 1000.0 | 4000 | 17.4 | 46.3 | 1213.4 | 52 | 57 | 5 |
| 1218.1 | 45 | 1500.0 | 4000 | 17.4 | 46.3 | 1213.4 | 40 | 47 | 6 |
| 1218.1 | 37 | 2000.0 | 4000 | 17.4 | 46.3 | 1213.4 | 33 | 38 | 5 |
| 1218.1 | 31 | 2500.0 | 4000 | 17.4 | 46.3 | 1213.4 | 29 | 32 | 3 |
| 1218.1 | 27 | 3000.0 | 4000 | 17.4 | 46.3 | 1213.4 | 26 | 27 | 1 |
| 1218.1 | 23 | 3500.0 | 4000 | 17.4 | 46.3 | 1213.4 | 23 | 23 | 1 |
| 1218.1 | 21 | 4000.0 | 4000 | 17.4 | 46.3 | 1213.4 | 21 | 19 | 2 |
| 1218.1 | 18 | 4500.0 | 4000 | 17.4 | 46.3 | 1213.4 | 20 | 17 | 3 |
| 1218.1 | 17 | 5000.0 | 4000 | 17.4 | 46.3 | 1213.4 | 19 | 14 | 5 |
| 1218.1 | 15 | 5500.0 | 4000 | 23.3 | 82.1 | 1613.0 | 19 | 11 | 7 |

FIG. 6

| H | A | D | R | α | d | h | ② 420 | ① 410 | Deviation 430 |
|---|---|---|---|---|---|---|---|---|---|
| 1218.1 | 56 | 1000.0 | 5000 | 14.0 | 37.0 | 1215.1 | 50 | 58 | 9 |
| 1218.1 | 45 | 1500.0 | 5000 | 14.0 | 37.0 | 1215.1 | 38 | 48 | 10 |
| 1218.1 | 37 | 2000.0 | 5000 | 14.0 | 37.0 | 1215.1 | 31 | 40 | 9 |
| 1218.1 | 31 | 2500.0 | 5000 | 14.0 | 37.0 | 1215.1 | 27 | 34 | 7 |
| 1218.1 | 27 | 3000.0 | 5000 | 14.0 | 37.0 | 1215.1 | 24 | 28 | 5 |
| 1218.1 | 23 | 3500.0 | 5000 | 14.0 | 37.0 | 1215.1 | 21 | 24 | 3 |
| 1218.1 | 21 | 4000.0 | 5000 | 14.0 | 37.0 | 1215.1 | 20 | 21 | 1 |
| 1218.1 | 18 | 4500.0 | 5000 | 14.0 | 37.0 | 1215.1 | 18 | 18 | 0 |
| 1218.1 | 17 | 5000.0 | 5000 | 14.0 | 37.0 | 1215.1 | 17 | 16 | 1 |
| 1218.1 | 15 | 5500.0 | 5000 | 23.3 | 102.7 | 2016.2 | 17 | 13 | 4 |

FIG. 8

| Inch | H | s | A | D | R | α | d | h | ① 410 | ② 420 | Deviation 430 |
|---|---|---|---|---|---|---|---|---|---|---|---|
| 55.0 | 1218.1 | 1500.0 | 26.6 | 3000.0 | 3000 | 23.3 | 61.6 | 1209.7 | 24 | 29 | 5 |
| 55.0 | 1218.1 | 1500.0 | 25.8 | 3100.0 | 3000 | 23.3 | 61.6 | 1209.7 | 23 | 28 | 5 |
| 55.0 | 1218.1 | 1500.0 | 25.1 | 3200.0 | 3000 | 23.3 | 61.6 | 1209.7 | 22 | 28 | 5 |
| 55.0 | 1218.1 | 1500.0 | 24.4 | 3300.0 | 3000 | 23.3 | 61.6 | 1209.7 | 21 | 27 | 6 |
| 55.0 | 1218.1 | 1500.0 | 23.8 | 3400.0 | 3000 | 23.3 | 61.6 | 1209.7 | 21 | 27 | 6 |
| 55.0 | 1218.1 | 1500.0 | 23.2 | 3500.0 | 3000 | 23.3 | 61.6 | 1209.7 | 20 | 26 | 6 |
| 55.0 | 1218.1 | 1500.0 | 22.6 | 3600.0 | 3000 | 23.3 | 61.6 | 1209.7 | 19 | 26 | 7 |
| 55.0 | 1218.1 | 1500.0 | 22.1 | 3700.0 | 3000 | 23.3 | 61.6 | 1209.7 | 18 | 25 | 7 |
| 55.0 | 1218.1 | 1500.0 | 21.5 | 3800.0 | 3000 | 23.3 | 61.6 | 1209.7 | 18 | 25 | 7 |
| 55.0 | 1218.1 | 1500.0 | 21.0 | 3900.0 | 3000 | 23.3 | 61.6 | 1209.7 | 17 | 25 | 8 |
| 55.0 | 1218.1 | 1500.0 | 20.6 | 4000.0 | 3000 | 23.3 | 61.6 | 1209.7 | 16 | 24 | 8 |
| | | | | | | | | | | Sum 810 | 70 |

FIG. 9

| Inch | H | s | A | D | R | a | d | h | ② | ① | Deviation |
|---|---|---|---|---|---|---|---|---|---|---|---|
| 55.0 | 1218.1 | 1500.0 | 26.6 | 3000.0 | 3100 | 22.5 | 59.6 | 1210.3 | 28 | 24 | 4 |
| 55.0 | 1218.1 | 1500.0 | 25.8 | 3100.0 | 3100 | 22.5 | 59.6 | 1210.3 | 28 | 23 | 4 |
| 55.0 | 1218.1 | 1500.0 | 25.1 | 3200.0 | 3100 | 22.5 | 59.6 | 1210.3 | 27 | 23 | 5 |
| 55.0 | 1218.1 | 1500.0 | 24.4 | 3300.0 | 3100 | 22.5 | 59.6 | 1210.3 | 27 | 22 | 5 |
| 55.0 | 1218.1 | 1500.0 | 23.8 | 3400.0 | 3100 | 22.5 | 59.6 | 1210.3 | 26 | 21 | 5 |
| 55.0 | 1218.1 | 1500.0 | 23.2 | 3500.0 | 3100 | 22.5 | 59.6 | 1210.3 | 26 | 20 | 6 |
| 55.0 | 1218.1 | 1500.0 | 22.6 | 3600.0 | 3100 | 22.5 | 59.6 | 1210.3 | 25 | 19 | 6 |
| 55.0 | 1218.1 | 1500.0 | 22.1 | 3700.0 | 3100 | 22.5 | 59.6 | 1210.3 | 25 | 19 | 6 |
| 55.0 | 1218.1 | 1500.0 | 21.5 | 3800.0 | 3100 | 22.5 | 59.6 | 1210.3 | 25 | 18 | 7 |
| 55.0 | 1218.1 | 1500.0 | 21.0 | 3900.0 | 3100 | 22.5 | 59.6 | 1210.3 | 24 | 17 | 7 |
| 55.0 | 1218.1 | 1500.0 | 20.6 | 4000.0 | 3100 | 22.5 | 59.6 | 1210.3 | 24 | 17 | 7 |
| | | | | | Sum | | | | | | 61 |

FIG. 10

| Inch | H | s | A | D | R | α | d | h | ② | ① | Deviation |
|---|---|---|---|---|---|---|---|---|---|---|---|
| 55.0 | 1218.1 | 1500.0 | 26.6 | 3000.0 | 3200 | 21.8 | 57.8 | 1210.8 | 28 | 25 | 3 |
| 55.0 | 1218.1 | 1500.0 | 25.8 | 3100.0 | 3200 | 21.8 | 57.8 | 1210.8 | 27 | 24 | 4 |
| 55.0 | 1218.1 | 1500.0 | 25.1 | 3200.0 | 3200 | 21.8 | 57.8 | 1210.8 | 27 | 23 | 4 |
| 55.0 | 1218.1 | 1500.0 | 24.4 | 3300.0 | 3200 | 21.8 | 57.8 | 1210.8 | 26 | 22 | 4 |
| 55.0 | 1218.1 | 1500.0 | 23.8 | 3400.0 | 3200 | 21.8 | 57.8 | 1210.8 | 26 | 21 | 5 |
| 55.0 | 1218.1 | 1500.0 | 23.2 | 3500.0 | 3200 | 21.8 | 57.8 | 1210.8 | 25 | 21 | 5 |
| 55.0 | 1218.1 | 1500.0 | 22.6 | 3600.0 | 3200 | 21.8 | 57.8 | 1210.8 | 25 | 20 | 5 |
| 55.0 | 1218.1 | 1500.0 | 22.1 | 3700.0 | 3200 | 21.8 | 57.8 | 1210.8 | 25 | 19 | 6 |
| 55.0 | 1218.1 | 1500.0 | 21.5 | 3800.0 | 3200 | 21.8 | 57.8 | 1210.8 | 24 | 18 | 6 |
| 55.0 | 1218.1 | 1500.0 | 21.0 | 3900.0 | 3200 | 21.8 | 57.8 | 1210.8 | 24 | 18 | 6 |
| 55.0 | 1218.1 | 1500.0 | 20.6 | 4000.0 | 3200 | 21.8 | 57.8 | 1210.8 | 24 | 17 | 6 |
|  |  |  |  |  | Sum |  |  |  |  |  | 54 |

FIG. 11

| Inch | H | s | A | D | R | α | d | h | ② | ① | Deviation |
|---|---|---|---|---|---|---|---|---|---|---|---|
| 55.0 | 1218.1 | 1500.0 | 26.6 | 3000.0 | 3300 | 21.1 | 56.0 | 1211.2 | 27 | 25 | 2 |
| 55.0 | 1218.1 | 1500.0 | 25.8 | 3100.0 | 3300 | 21.1 | 56.0 | 1211.2 | 27 | 24 | 3 |
| 55.0 | 1218.1 | 1500.0 | 25.1 | 3200.0 | 3300 | 21.1 | 56.0 | 1211.2 | 26 | 23 | 3 |
| 55.0 | 1218.1 | 1500.0 | 24.4 | 3300.0 | 3300 | 21.1 | 56.0 | 1211.2 | 26 | 22 | 4 |
| 55.0 | 1218.1 | 1500.0 | 23.8 | 3400.0 | 3300 | 21.1 | 56.0 | 1211.2 | 26 | 22 | 4 |
| 55.0 | 1218.1 | 1500.0 | 23.2 | 3500.0 | 3300 | 21.1 | 56.0 | 1211.2 | 25 | 21 | 4 |
| 55.0 | 1218.1 | 1500.0 | 22.6 | 3600.0 | 3300 | 21.1 | 56.0 | 1211.2 | 25 | 20 | 5 |
| 55.0 | 1218.1 | 1500.0 | 22.1 | 3700.0 | 3300 | 21.1 | 56.0 | 1211.2 | 24 | 19 | 5 |
| 55.0 | 1218.1 | 1500.0 | 21.5 | 3800.0 | 3300 | 21.1 | 56.0 | 1211.2 | 24 | 19 | 5 |
| 55.0 | 1218.1 | 1500.0 | 21.0 | 3900.0 | 3300 | 21.1 | 56.0 | 1211.2 | 24 | 18 | 6 |
| 55.0 | 1218.1 | 1500.0 | 20.6 | 4000.0 | 3300 | 21.1 | 56.0 | 1211.2 | 23 | 18 | 6 |
| | | | | | | | | | | Sum | 46 |

FIG. 12

| Inch | H | s | A | D | R | α | d | h | ② | ① | Deviation |
|---|---|---|---|---|---|---|---|---|---|---|---|
| 55.0 | 1218.1 | 1500.0 | 26.6 | 3000.0 | 3400 | 20.5 | 54.4 | 1211.6 | 27 | 25 | 2 |
| 55.0 | 1218.1 | 1500.0 | 25.8 | 3100.0 | 3400 | 20.5 | 54.4 | 1211.6 | 27 | 24 | 2 |
| 55.0 | 1218.1 | 1500.0 | 25.1 | 3200.0 | 3400 | 20.5 | 54.4 | 1211.6 | 26 | 24 | 3 |
| 55.0 | 1218.1 | 1500.0 | 24.4 | 3300.0 | 3400 | 20.5 | 54.4 | 1211.6 | 26 | 23 | 3 |
| 55.0 | 1218.1 | 1500.0 | 23.8 | 3400.0 | 3400 | 20.5 | 54.4 | 1211.6 | 25 | 22 | 3 |
| 55.0 | 1218.1 | 1500.0 | 23.2 | 3500.0 | 3400 | 20.5 | 54.4 | 1211.6 | 25 | 21 | 4 |
| 55.0 | 1218.1 | 1500.0 | 22.6 | 3600.0 | 3400 | 20.5 | 54.4 | 1211.6 | 24 | 20 | 4 |
| 55.0 | 1218.1 | 1500.0 | 22.1 | 3700.0 | 3400 | 20.5 | 54.4 | 1211.6 | 24 | 20 | 4 |
| 55.0 | 1218.1 | 1500.0 | 21.5 | 3800.0 | 3400 | 20.5 | 54.4 | 1211.6 | 24 | 19 | 5 |
| 55.0 | 1218.1 | 1500.0 | 21.0 | 3900.0 | 3400 | 20.5 | 54.4 | 1211.6 | 23 | 18 | 5 |
| 55.0 | 1218.1 | 1500.0 | 20.6 | 4000.0 | 3400 | 20.5 | 54.4 | 1211.6 | 23 | 18 | 5 |
| | | | | Sum | | | | | | | 40 |

FIG. 13

| Inch | H | s | A | D | R | α | d | h | ② | ① | Deviation |
|---|---|---|---|---|---|---|---|---|---|---|---|
| 55.0 | 1218.1 | 1500.0 | 26.6 | 3000.0 | 3500 | 19.9 | 52.9 | 1212.0 | 27 | 26 | 1 |
| 55.0 | 1218.1 | 1500.0 | 25.8 | 3100.0 | 3500 | 19.9 | 52.9 | 1212.0 | 26 | 25 | 2 |
| 55.0 | 1218.1 | 1500.0 | 25.1 | 3200.0 | 3500 | 19.9 | 52.9 | 1212.0 | 26 | 24 | 2 |
| 55.0 | 1218.1 | 1500.0 | 24.4 | 3300.0 | 3500 | 19.9 | 52.9 | 1212.0 | 25 | 23 | 2 |
| 55.0 | 1218.1 | 1500.0 | 23.8 | 3400.0 | 3500 | 19.9 | 52.9 | 1212.0 | 25 | 22 | 3 |
| 55.0 | 1218.1 | 1500.0 | 23.2 | 3500.0 | 3500 | 19.9 | 52.9 | 1212.0 | 25 | 21 | 3 |
| 55.0 | 1218.1 | 1500.0 | 22.6 | 3600.0 | 3500 | 19.9 | 52.9 | 1212.0 | 24 | 21 | 3 |
| 55.0 | 1218.1 | 1500.0 | 22.1 | 3700.0 | 3500 | 19.9 | 52.9 | 1212.0 | 24 | 20 | 4 |
| 55.0 | 1218.1 | 1500.0 | 21.5 | 3800.0 | 3500 | 19.9 | 52.9 | 1212.0 | 23 | 19 | 4 |
| 55.0 | 1218.1 | 1500.0 | 21.0 | 3900.0 | 3500 | 19.9 | 52.9 | 1212.0 | 23 | 19 | 4 |
| 55.0 | 1218.1 | 1500.0 | 20.6 | 4000.0 | 3500 | 19.9 | 52.9 | 1212.0 | 23 | 18 | 5 |
| | | | | | Sum | | | | | | 33 |

FIG. 14

| Inch | H | s | A | D | R | α | d | h | ② | ① | Deviation |
|---|---|---|---|---|---|---|---|---|---|---|---|
| 55.0 | 1218.1 | 1500.0 | 26.6 | 3000.0 | 3600 | 19.4 | 51.4 | 1212.3 | 27 | 26 | 1 |
| 55.0 | 1218.1 | 1500.0 | 25.8 | 3100.0 | 3600 | 19.4 | 51.4 | 1212.3 | 26 | 25 | 1 |
| 55.0 | 1218.1 | 1500.0 | 25.1 | 3200.0 | 3600 | 19.4 | 51.4 | 1212.3 | 26 | 24 | 1 |
| 55.0 | 1218.1 | 1500.0 | 24.4 | 3300.0 | 3600 | 19.4 | 51.4 | 1212.3 | 25 | 23 | 2 |
| 55.0 | 1218.1 | 1500.0 | 23.8 | 3400.0 | 3600 | 19.4 | 51.4 | 1212.3 | 25 | 22 | 2 |
| 55.0 | 1218.1 | 1500.0 | 23.2 | 3500.0 | 3600 | 19.4 | 51.4 | 1212.3 | 24 | 22 | 3 |
| 55.0 | 1218.1 | 1500.0 | 22.6 | 3600.0 | 3600 | 19.4 | 51.4 | 1212.3 | 24 | 21 | 3 |
| 55.0 | 1218.1 | 1500.0 | 22.1 | 3700.0 | 3600 | 19.4 | 51.4 | 1212.3 | 23 | 20 | 3 |
| 55.0 | 1218.1 | 1500.0 | 21.5 | 3800.0 | 3600 | 19.4 | 51.4 | 1212.3 | 23 | 20 | 3 |
| 55.0 | 1218.1 | 1500.0 | 21.0 | 3900.0 | 3600 | 19.4 | 51.4 | 1212.3 | 23 | 19 | 4 |
| 55.0 | 1218.1 | 1500.0 | 20.6 | 4000.0 | 3600 | 19.4 | 51.4 | 1212.3 | 22 | 18 | 4 |
| | | | | | Sum | | | | | | 27 |

FIG. 15

| Inch | H | s | A | D | R | α | d | h | ② | ① | Deviation |
|---|---|---|---|---|---|---|---|---|---|---|---|
| 55.0 | 1218.1 | 1500.0 | 26.6 | 3000.0 | 3700 | 18.9 | 50.0 | 1212.6 | 26 | 26 | 0 |
| 55.0 | 1218.1 | 1500.0 | 25.8 | 3100.0 | 3700 | 18.9 | 50.0 | 1212.6 | 26 | 25 | 1 |
| 55.0 | 1218.1 | 1500.0 | 25.1 | 3200.0 | 3700 | 18.9 | 50.0 | 1212.6 | 25 | 24 | 1 |
| 55.0 | 1218.1 | 1500.0 | 24.4 | 3300.0 | 3700 | 18.9 | 50.0 | 1212.6 | 25 | 24 | 1 |
| 55.0 | 1218.1 | 1500.0 | 23.8 | 3400.0 | 3700 | 18.9 | 50.0 | 1212.6 | 24 | 23 | 2 |
| 55.0 | 1218.1 | 1500.0 | 23.2 | 3500.0 | 3700 | 18.9 | 50.0 | 1212.6 | 24 | 22 | 2 |
| 55.0 | 1218.1 | 1500.0 | 22.6 | 3600.0 | 3700 | 18.9 | 50.0 | 1212.6 | 24 | 21 | 2 |
| 55.0 | 1218.1 | 1500.0 | 22.1 | 3700.0 | 3700 | 18.9 | 50.0 | 1212.6 | 23 | 21 | 3 |
| 55.0 | 1218.1 | 1500.0 | 21.5 | 3800.0 | 3700 | 18.9 | 50.0 | 1212.6 | 23 | 20 | 3 |
| 55.0 | 1218.1 | 1500.0 | 21.0 | 3900.0 | 3700 | 18.9 | 50.0 | 1212.6 | 22 | 19 | 3 |
| 55.0 | 1218.1 | 1500.0 | 20.6 | 4000.0 | 3700 | 18.9 | 50.0 | 1212.6 | 22 | 19 | 4 |
| | | | | | Sum | | | | | | 21 |

FIG. 16

| Inch | H | s | A | D | R | α | d | h | ② | ① | Deviation |
|------|------|------|----|------|------|----|----|------|----|----|-----------|
| 55 | 1218 | 1500 | 27 | 3000 | 3800 | 18 | 49 | 1213 | 26 | 26 | 0 |
| 55 | 1218 | 1500 | 26 | 3100 | 3800 | 18 | 49 | 1213 | 26 | 25 | 0 |
| 55 | 1218 | 1500 | 25 | 3200 | 3800 | 18 | 49 | 1213 | 25 | 25 | 0 |
| 55 | 1218 | 1500 | 24 | 3300 | 3800 | 18 | 49 | 1213 | 25 | 24 | 1 |
| 55 | 1218 | 1500 | 24 | 3400 | 3800 | 18 | 49 | 1213 | 24 | 23 | 1 |
| 55 | 1218 | 1500 | 23 | 3500 | 3800 | 18 | 49 | 1213 | 24 | 22 | 1 |
| 55 | 1218 | 1500 | 23 | 3600 | 3800 | 18 | 49 | 1213 | 23 | 21 | 2 |
| 55 | 1218 | 1500 | 22 | 3700 | 3800 | 18 | 49 | 1213 | 23 | 21 | 2 |
| 55 | 1218 | 1500 | 22 | 3800 | 3800 | 18 | 49 | 1213 | 23 | 20 | 2 |
| 55 | 1218 | 1500 | 21 | 3900 | 3800 | 18 | 49 | 1213 | 22 | 19 | 3 |
| 55 | 1218 | 1500 | 21 | 4000 | 3800 | 18 | 49 | 1213 | 22 | 19 | 3 |
| | | | | | Sum | | | | | | 16 |

FIG. 17

| Inch | H | s | A | D | R | α | d | h | ② 420 | ① 410 | Deviation 430 |
|---|---|---|---|---|---|---|---|---|---|---|---|
| 55 | 1218 | 1500 | 27 | 3000 | 3900 | 18 | 47 | 1213 | 26 | 27 | 1 |
| 55 | 1218 | 1500 | 26 | 3100 | 3900 | 18 | 47 | 1213 | 25 | 26 | 0 |
| 55 | 1218 | 1500 | 25 | 3200 | 3900 | 18 | 47 | 1213 | 25 | 25 | 0 |
| 55 | 1218 | 1500 | 24 | 3300 | 3900 | 18 | 47 | 1213 | 24 | 24 | 0 |
| 55 | 1218 | 1500 | 24 | 3400 | 3900 | 18 | 47 | 1213 | 24 | 23 | 1 |
| 55 | 1218 | 1500 | 23 | 3500 | 3900 | 18 | 47 | 1213 | 23 | 22 | 1 |
| 55 | 1218 | 1500 | 23 | 3600 | 3900 | 18 | 47 | 1213 | 23 | 22 | 1 |
| 55 | 1218 | 1500 | 22 | 3700 | 3900 | 18 | 47 | 1213 | 23 | 21 | 2 |
| 55 | 1218 | 1500 | 22 | 3800 | 3900 | 18 | 47 | 1213 | 22 | 20 | 2 |
| 55 | 1218 | 1500 | 21 | 3900 | 3900 | 18 | 47 | 1213 | 22 | 20 | 2 |
| 55 | 1218 | 1500 | 21 | 4000 | 3900 | 18 | 47 | 1213 | 22 | 19 | 3 |
| | | | | | Sum 810 | | | | | | 13 |

FIG. 18

| Inch | H | s | A | D | R | α | d | h | ② | ① | Deviation |
|---|---|---|---|---|---|---|---|---|---|---|---|
| 55 | 1218 | 1500 | 27 | 3000 | 4000 | 17 | 46 | 1213 | 26 | 27 | 1 |
| 55 | 1218 | 1500 | 26 | 3100 | 4000 | 17 | 46 | 1213 | 25 | 26 | 1 |
| 55 | 1218 | 1500 | 25 | 3200 | 4000 | 17 | 46 | 1213 | 25 | 25 | 0 |
| 55 | 1218 | 1500 | 24 | 3300 | 4000 | 17 | 46 | 1213 | 24 | 24 | 0 |
| 55 | 1218 | 1500 | 24 | 3400 | 4000 | 17 | 46 | 1213 | 24 | 23 | 0 |
| 55 | 1218 | 1500 | 23 | 3500 | 4000 | 17 | 46 | 1213 | 23 | 23 | 1 |
| 55 | 1218 | 1500 | 23 | 3600 | 4000 | 17 | 46 | 1213 | 23 | 22 | 1 |
| 55 | 1218 | 1500 | 22 | 3700 | 4000 | 17 | 46 | 1213 | 22 | 21 | 1 |
| 55 | 1218 | 1500 | 22 | 3800 | 4000 | 17 | 46 | 1213 | 22 | 21 | 2 |
| 55 | 1218 | 1500 | 21 | 3900 | 4000 | 17 | 46 | 1213 | 22 | 20 | 2 |
| 55 | 1218 | 1500 | 21 | 4000 | 4000 | 17 | 46 | 1213 | 21 | 19 | 2 |
| | | | | | Sum | | | | | | 11 |

FIG. 19

| Inch | H | s | A | D | R | α | d | h | ② 420 | ① 410 | Deviation 430 |
|---|---|---|---|---|---|---|---|---|---|---|---|
| 55 | 1218 | 1500 | 27 | 3000 | 4100 | 17 | 45 | 1214 | 25 | 27 | 2 |
| 55 | 1218 | 1500 | 26 | 3100 | 4100 | 17 | 45 | 1214 | 25 | 26 | 1 |
| 55 | 1218 | 1500 | 25 | 3200 | 4100 | 17 | 45 | 1214 | 24 | 25 | 1 |
| 55 | 1218 | 1500 | 24 | 3300 | 4100 | 17 | 45 | 1214 | 24 | 24 | 1 |
| 55 | 1218 | 1500 | 24 | 3400 | 4100 | 17 | 45 | 1214 | 23 | 24 | 0 |
| 55 | 1218 | 1500 | 23 | 3500 | 4100 | 17 | 45 | 1214 | 23 | 23 | 0 |
| 55 | 1218 | 1500 | 23 | 3600 | 4100 | 17 | 45 | 1214 | 23 | 22 | 0 |
| 55 | 1218 | 1500 | 22 | 3700 | 4100 | 17 | 45 | 1214 | 22 | 21 | 1 |
| 55 | 1218 | 1500 | 22 | 3800 | 4100 | 17 | 45 | 1214 | 22 | 21 | 1 |
| 55 | 1218 | 1500 | 21 | 3900 | 4100 | 17 | 45 | 1214 | 22 | 20 | 1 |
| 55 | 1218 | 1500 | 21 | 4000 | 4100 | 17 | 45 | 1214 | 21 | 20 | 2 |
| | | | | | Sum 810 | | | | | | 10 |

FIG. 20

| Inch | H | s | A | D | R | α | d | h | ② | ③ | Deviation |
|------|------|------|----|------|------|----|----|------|----|----|-----------|
| 55 | 1218 | 1500 | 27 | 3000 | 4200 | 17 | 44 | 1214 | 25 | 27 | 2 |
| 55 | 1218 | 1500 | 26 | 3100 | 4200 | 17 | 44 | 1214 | 25 | 26 | 2 |
| 55 | 1218 | 1500 | 25 | 3200 | 4200 | 17 | 44 | 1214 | 24 | 25 | 1 |
| 55 | 1218 | 1500 | 24 | 3300 | 4200 | 17 | 44 | 1214 | 24 | 25 | 1 |
| 55 | 1218 | 1500 | 24 | 3400 | 4200 | 17 | 44 | 1214 | 23 | 24 | 1 |
| 55 | 1218 | 1500 | 23 | 3500 | 4200 | 17 | 44 | 1214 | 23 | 23 | 0 |
| 55 | 1218 | 1500 | 23 | 3600 | 4200 | 17 | 44 | 1214 | 22 | 22 | 0 |
| 55 | 1218 | 1500 | 22 | 3700 | 4200 | 17 | 44 | 1214 | 22 | 22 | 0 |
| 55 | 1218 | 1500 | 22 | 3800 | 4200 | 17 | 44 | 1214 | 22 | 21 | 1 |
| 55 | 1218 | 1500 | 21 | 3900 | 4200 | 17 | 44 | 1214 | 21 | 20 | 1 |
| 55 | 1218 | 1500 | 21 | 4000 | 4200 | 17 | 44 | 1214 | 21 | 20 | 1 |
| | | | | | Sum | | | | | | 10 |

FIG. 21

| Inch | H | s | A | D | R | α | d | h | ② | ① | Deviation |
|---|---|---|---|---|---|---|---|---|---|---|---|
| 55 | 1218 | 1500 | 27 | 3000 | 4300 | 16 | 43 | 1214 | 25 | 27 | 2 |
| 55 | 1218 | 1500 | 26 | 3100 | 4300 | 16 | 43 | 1214 | 24 | 26 | 2 |
| 55 | 1218 | 1500 | 25 | 3200 | 4300 | 16 | 43 | 1214 | 24 | 26 | 2 |
| 55 | 1218 | 1500 | 24 | 3300 | 4300 | 16 | 43 | 1214 | 23 | 25 | 1 |
| 55 | 1218 | 1500 | 24 | 3400 | 4300 | 16 | 43 | 1214 | 23 | 24 | 1 |
| 55 | 1218 | 1500 | 23 | 3500 | 4300 | 16 | 43 | 1214 | 23 | 23 | 1 |
| 55 | 1218 | 1500 | 23 | 3600 | 4300 | 16 | 43 | 1214 | 22 | 23 | 0 |
| 55 | 1218 | 1500 | 22 | 3700 | 4300 | 16 | 43 | 1214 | 22 | 22 | 0 |
| 55 | 1218 | 1500 | 22 | 3800 | 4300 | 16 | 43 | 1214 | 21 | 21 | 0 |
| 55 | 1218 | 1500 | 21 | 3900 | 4300 | 16 | 43 | 1214 | 21 | 21 | 1 |
| 55 | 1218 | 1500 | 21 | 4000 | 4300 | 16 | 43 | 1214 | 21 | 20 | 1 |
| | | | | | Sum | | | | | | 11 |

FIG. 22

| Inch | H | s | A | D | R | α | d | h | ② | ① | Deviation |
|---|---|---|---|---|---|---|---|---|---|---|---|
| 55 | 1218 | 1500 | 27 | 3000 | 4400 | 16 | 42 | 1214 | 25 | 28 | 3 |
| 55 | 1218 | 1500 | 26 | 3100 | 4400 | 16 | 42 | 1214 | 24 | 27 | 2 |
| 55 | 1218 | 1500 | 25 | 3200 | 4400 | 16 | 42 | 1214 | 24 | 26 | 2 |
| 55 | 1218 | 1500 | 24 | 3300 | 4400 | 16 | 42 | 1214 | 23 | 25 | 2 |
| 55 | 1218 | 1500 | 24 | 3400 | 4400 | 16 | 42 | 1214 | 23 | 24 | 1 |
| 55 | 1218 | 1500 | 23 | 3500 | 4400 | 16 | 42 | 1214 | 22 | 23 | 1 |
| 55 | 1218 | 1500 | 23 | 3600 | 4400 | 16 | 42 | 1214 | 22 | 23 | 1 |
| 55 | 1218 | 1500 | 22 | 3700 | 4400 | 16 | 42 | 1214 | 22 | 22 | 0 |
| 55 | 1218 | 1500 | 22 | 3800 | 4400 | 16 | 42 | 1214 | 21 | 21 | 0 |
| 55 | 1218 | 1500 | 21 | 3900 | 4400 | 16 | 42 | 1214 | 21 | 21 | 0 |
| 55 | 1218 | 1500 | 21 | 4000 | 4400 | 16 | 42 | 1214 | 21 | 20 | 1 |
| | | | | | Sum | | | | | | 13 |

FIG. 23

| Inch | H | s | A | D | R | α | d | h | ② | ① | Deviation |
|---|---|---|---|---|---|---|---|---|---|---|---|
| 55 | 1218 | 1500 | 27 | 3000 | 4500 | 16 | 41 | 1214 | 25 | 28 | 3 |
| 55 | 1218 | 1500 | 26 | 3100 | 4500 | 16 | 41 | 1214 | 24 | 27 | 3 |
| 55 | 1218 | 1500 | 25 | 3200 | 4500 | 16 | 41 | 1214 | 24 | 26 | 2 |
| 55 | 1218 | 1500 | 24 | 3300 | 4500 | 16 | 41 | 1214 | 23 | 25 | 2 |
| 55 | 1218 | 1500 | 24 | 3400 | 4500 | 16 | 41 | 1214 | 23 | 24 | 2 |
| 55 | 1218 | 1500 | 23 | 3500 | 4500 | 16 | 41 | 1214 | 22 | 24 | 1 |
| 55 | 1218 | 1500 | 23 | 3600 | 4500 | 16 | 41 | 1214 | 22 | 23 | 1 |
| 55 | 1218 | 1500 | 22 | 3700 | 4500 | 16 | 41 | 1214 | 21 | 22 | 1 |
| 55 | 1218 | 1500 | 22 | 3800 | 4500 | 16 | 41 | 1214 | 21 | 22 | 0 |
| 55 | 1218 | 1500 | 21 | 3900 | 4500 | 16 | 41 | 1214 | 21 | 21 | 0 |
| 55 | 1218 | 1500 | 21 | 4000 | 4500 | 16 | 41 | 1214 | 20 | 20 | 0 |
| | | | | | Sum | | | | | | 16 |

FIG. 24

| Inch | H | s | A | D | R | α | d | h | ② | ① | Deviation |
|---|---|---|---|---|---|---|---|---|---|---|---|
| 55 | 1218 | 1500 | 27 | 3000 | 4600 | 15 | 40 | 1215 | 24 | 28 | 3 |
| 55 | 1218 | 1500 | 26 | 3100 | 4600 | 15 | 40 | 1215 | 24 | 27 | 3 |
| 55 | 1218 | 1500 | 25 | 3200 | 4600 | 15 | 40 | 1215 | 23 | 26 | 3 |
| 55 | 1218 | 1500 | 24 | 3300 | 4600 | 15 | 40 | 1215 | 23 | 25 | 2 |
| 55 | 1218 | 1500 | 24 | 3400 | 4600 | 15 | 40 | 1215 | 22 | 25 | 2 |
| 55 | 1218 | 1500 | 23 | 3500 | 4600 | 15 | 40 | 1215 | 22 | 24 | 2 |
| 55 | 1218 | 1500 | 23 | 3600 | 4600 | 15 | 40 | 1215 | 22 | 23 | 1 |
| 55 | 1218 | 1500 | 22 | 3700 | 4600 | 15 | 40 | 1215 | 21 | 22 | 1 |
| 55 | 1218 | 1500 | 22 | 3800 | 4600 | 15 | 40 | 1215 | 21 | 22 | 1 |
| 55 | 1218 | 1500 | 21 | 3900 | 4600 | 15 | 40 | 1215 | 21 | 21 | 0 |
| 55 | 1218 | 1500 | 21 | 4000 | 4600 | 15 | 40 | 1215 | 20 | 20 | 0 |
| | | | | | Sum | | | | | | 19 |

FIG. 25

| Inch | H | s | A | D | R | α | d | h | ② | ① | Deviation |
|---|---|---|---|---|---|---|---|---|---|---|---|
| 55 | 1218 | 1500 | 27 | 3000 | 4700 | 15 | 39 | 1215 | 24 | 28 | 4 |
| 55 | 1218 | 1500 | 26 | 3100 | 4700 | 15 | 39 | 1215 | 24 | 27 | 3 |
| 55 | 1218 | 1500 | 25 | 3200 | 4700 | 15 | 39 | 1215 | 23 | 26 | 3 |
| 55 | 1218 | 1500 | 24 | 3300 | 4700 | 15 | 39 | 1215 | 23 | 25 | 3 |
| 55 | 1218 | 1500 | 24 | 3400 | 4700 | 15 | 39 | 1215 | 22 | 25 | 2 |
| 55 | 1218 | 1500 | 23 | 3500 | 4700 | 15 | 39 | 1215 | 22 | 24 | 2 |
| 55 | 1218 | 1500 | 23 | 3600 | 4700 | 15 | 39 | 1215 | 21 | 23 | 2 |
| 55 | 1218 | 1500 | 22 | 3700 | 4700 | 15 | 39 | 1215 | 21 | 23 | 1 |
| 55 | 1218 | 1500 | 22 | 3800 | 4700 | 15 | 39 | 1215 | 21 | 22 | 1 |
| 55 | 1218 | 1500 | 21 | 3900 | 4700 | 15 | 39 | 1215 | 20 | 21 | 1 |
| 55 | 1218 | 1500 | 21 | 4000 | 4700 | 15 | 39 | 1215 | 20 | 21 | 0 |
| | | | | | Sum | | | | | | 23 |

FIG. 26

| Inch | H | s | A | D | R | α | d | h | ② | ① | Deviation |
|---|---|---|---|---|---|---|---|---|---|---|---|
| 55 | 1218 | 1500 | 27 | 3000 | 4800 | 15 | 39 | 1215 | 24 | 28 | 4 |
| 55 | 1218 | 1500 | 26 | 3100 | 4800 | 15 | 39 | 1215 | 24 | 27 | 4 |
| 55 | 1218 | 1500 | 25 | 3200 | 4800 | 15 | 39 | 1215 | 23 | 26 | 3 |
| 55 | 1218 | 1500 | 24 | 3300 | 4800 | 15 | 39 | 1215 | 23 | 26 | 3 |
| 55 | 1218 | 1500 | 24 | 3400 | 4800 | 15 | 39 | 1215 | 22 | 25 | 3 |
| 55 | 1218 | 1500 | 23 | 3500 | 4800 | 15 | 39 | 1215 | 22 | 24 | 2 |
| 55 | 1218 | 1500 | 23 | 3600 | 4800 | 15 | 39 | 1215 | 21 | 23 | 2 |
| 55 | 1218 | 1500 | 22 | 3700 | 4800 | 15 | 39 | 1215 | 21 | 23 | 2 |
| 55 | 1218 | 1500 | 22 | 3800 | 4800 | 15 | 39 | 1215 | 21 | 22 | 1 |
| 55 | 1218 | 1500 | 21 | 3900 | 4800 | 15 | 39 | 1215 | 20 | 21 | 1 |
| 55 | 1218 | 1500 | 21 | 4000 | 4800 | 15 | 39 | 1215 | 20 | 21 | 1 |
| | | | | | Sum | | | | | | 26 |

FIG. 27

| Inch | H | s | A | D | R | α | d | h | ② | ① | Deviation |
|---|---|---|---|---|---|---|---|---|---|---|---|
| 55 | 1218 | 1500 | 27 | 3000 | 4900 | 14 | 38 | 1215 | 24 | 28 | 4 |
| 55 | 1218 | 1500 | 26 | 3100 | 4900 | 14 | 38 | 1215 | 23 | 27 | 4 |
| 55 | 1218 | 1500 | 25 | 3200 | 4900 | 14 | 38 | 1215 | 23 | 27 | 4 |
| 55 | 1218 | 1500 | 24 | 3300 | 4900 | 14 | 38 | 1215 | 22 | 26 | 3 |
| 55 | 1218 | 1500 | 24 | 3400 | 4900 | 14 | 38 | 1215 | 22 | 25 | 3 |
| 55 | 1218 | 1500 | 23 | 3500 | 4900 | 14 | 38 | 1215 | 22 | 24 | 3 |
| 55 | 1218 | 1500 | 23 | 3600 | 4900 | 14 | 38 | 1215 | 21 | 23 | 2 |
| 55 | 1218 | 1500 | 22 | 3700 | 4900 | 14 | 38 | 1215 | 21 | 23 | 2 |
| 55 | 1218 | 1500 | 22 | 3800 | 4900 | 14 | 38 | 1215 | 20 | 22 | 2 |
| 55 | 1218 | 1500 | 21 | 3900 | 4900 | 14 | 38 | 1215 | 20 | 21 | 1 |
| 55 | 1218 | 1500 | 21 | 4000 | 4900 | 14 | 38 | 1215 | 20 | 21 | 1 |
| | | | | Sum | | | | | | | 29 |

FIG. 28

| Inch | H | s | A | D | R | α | d | h | ② | ① | Deviation |
|---|---|---|---|---|---|---|---|---|---|---|---|
| 55 | 1218 | 1500 | 27 | 3000 | 5000 | 14 | 37 | 1215 | 24 | 28 | 5 |
| 55 | 1218 | 1500 | 26 | 3100 | 5000 | 14 | 37 | 1215 | 23 | 28 | 4 |
| 55 | 1218 | 1500 | 25 | 3200 | 5000 | 14 | 37 | 1215 | 23 | 27 | 4 |
| 55 | 1218 | 1500 | 24 | 3300 | 5000 | 14 | 37 | 1215 | 22 | 26 | 4 |
| 55 | 1218 | 1500 | 24 | 3400 | 5000 | 14 | 37 | 1215 | 22 | 25 | 3 |
| 55 | 1218 | 1500 | 23 | 3500 | 5000 | 14 | 37 | 1215 | 21 | 24 | 3 |
| 55 | 1218 | 1500 | 23 | 3600 | 5000 | 14 | 37 | 1215 | 21 | 24 | 3 |
| 55 | 1218 | 1500 | 22 | 3700 | 5000 | 14 | 37 | 1215 | 21 | 23 | 2 |
| 55 | 1218 | 1500 | 22 | 3800 | 5000 | 14 | 37 | 1215 | 20 | 22 | 2 |
| 55 | 1218 | 1500 | 21 | 3900 | 5000 | 14 | 37 | 1215 | 20 | 22 | 2 |
| 55 | 1218 | 1500 | 21 | 4000 | 5000 | 14 | 37 | 1215 | 20 | 21 | 1 |
| | | | | | Sum | | | | | | 33 |

FIG. 29

| Curvature | Sum_Deviation |
|---|---|
| 3000 | 70 |
| 3100 | 61 |
| 3200 | 54 |
| 3300 | 46 |
| 3400 | 40 |
| 3500 | 33 |
| 3600 | 27 |
| 3700 | 21 |
| 3800 | 16 |
| 3900 | 13 |
| 4000 | 11 |
| 4100 | 10 |
| 4200 | 10 |
| 4300 | 11 |
| 4400 | 13 |
| 4500 | 16 |
| 4600 | 19 |
| 4700 | 23 |
| 4800 | 26 |
| 4900 | 29 |
| 5000 | 33 |

DISPLAY PANEL, METHOD FOR DESIGNING DISPLAY PANEL AND RECORDING MEDIUM THEREOF

CROSS-REFERENCE TO RELATED APPLICATION

This application claims priority from Korean Patent Application No. 10-2014-0052500, filed on Apr. 30, 2014 in the Korean Intellectual Property Office, the disclosure of which is incorporated herein by reference in its entirety.

BACKGROUND

1. Field

Methods and apparatuses consistent with exemplary embodiments relate to a display panel, a method for designing a display panel and a recording medium thereof, and more particularly, to a display panel including an optimum curvature radius, a method for designing a display pane and a recording medium thereof.

2. Description of the Related Art

Various display apparatuses such as a television (TV), a cellular phone, a notebook computer, a personal digital assistant (PDA) and the like are commonly used.

Accordingly, manufactures make an effort to provide display apparatuses that correspond to needs of uses, and thus products with a new functions are coming out one after another.

When compared with a flat display panel, a curved display panel enlarges a viewing angle and increases viewer immersion.

However, viewers located in an area other than a central area of the curved display experience a distorted viewing angle that distorts the displayed image.

Accordingly, there is a need to increase the area from which a viewer can enjoy a non-distorted or minimally distorted image. It should not be assumed, on the basis of this section, that the issues described in this section have been recognized in any prior art.

SUMMARY

Exemplary embodiments overcome the above disadvantages and other disadvantages not described above. Also, an exemplary embodiment is not required to overcome the disadvantages described above, and an exemplary embodiment of the present disclosure may not overcome any of the problems described above. An aspect of the present disclosure provides a display panel including a curvature which reduces a distortion of a viewing angle, a method of designing a display panel and a recording medium thereof.

According to an aspect of an exemplary embodiment, there is provided a method for designing a display panel, the method including: calculating, for each of a plurality of viewing locations, configured to change a viewing location and repeatedly calculate a difference value between a right side viewing angle of that viewing location and a left side viewing angle of that viewing location, the calculating being performed for each of a plurality of curvatures; of each viewing location according to a curvature of the display panel; and setting, from among the plurality of curvatures, a curvature of the display panel based on the difference values.

Setting the curvature of the display panel may be based on a curvature range and a viewing distance range resulting in a smallest difference value.

Setting the curvature of the display panel may include calculating, for each of the plurality of curvatures, a sum of calculated difference values regarding the plurality of viewing locations; and setting a curvature where the sum of the differences values is minimized to a curvature of the display panel.

The calculating includes setting the curvature of the display panel to a first curvature; repeating a process of: setting a viewing location for viewing the display panel including the first curvature and calculating a difference value between a right side viewing angle and a left side viewing angle of the set viewing location a plurality of times, and storing the performed result; setting the curvature of the display panel to a second curvature; and repeating a process of: setting a viewing location for viewing the display panel including the second curvature and calculating a difference value between a right side viewing angle and a left side viewing angle of the set viewing location a plurality of times, and storing the performed result.

Calculating the difference value between the right side viewing angle and the left side viewing angle of the set viewing location comprises: comparing a first viewing direction from a predetermined standard location toward a central area of the display panel with a second viewing direction from the set viewing location toward the central area of the display panel and calculating a central viewing angle between the first and second viewing directions; calculating a viewing distance connecting a first plane where the central area is located and a second plane where the set viewing location is located, the first plane and the second plane being parallel, the viewing distance being a shortest distance between the first and second planes; calculating each of a right side viewing angle and a left side viewing angle of the set viewing location using the central viewing angle and the viewing distance; and calculating and storing the difference value between the right side viewing angle and the left side viewing angle.

The central viewing angle may be calculated by Equation 1.

Herein, S represents a width direction length along the second plan from the set viewing location to the central area of the display panel, and D represents the viewing distance.

The right side viewing angle may be calculated by Equation 2, and the left side viewing angle may be calculated by Equation 3.

Herein, D represents a viewing distance connecting a first plane where a central area of the display panel is located and a second plane where the set viewing location is located, the first plane and the second plane being parallel, the viewing distance being a shortest distance between the first and second planes, A represents a viewing angle between a first viewing direction from a predetermined standard location toward the central area of the display panel and a second viewing direction from the set viewing location toward the central area of the display panel, h represents a width direction length of the display panel in a straight line, d represents a distance along a third plane that is orthogonal to the first plane between the central area of the display panel and an outside edge of the display panel.

A display panel according to an exemplary embodiment is designed and manufactured by a design method of the display panel described above.

According to an aspect of another exemplary embodiment, there is provided a non-transitory computer readable medium configured to execute a program for performing a design method of the display panel described above.

The difference value may be a deviation between a right side viewing angle of a set viewing location and a left side viewing angle of the set viewing location.

According to an aspect of another exemplary embodiment, there is provided a method for designing a display panel, the method including: repeatedly calculating, for a first curvature, a difference value between a right side viewing angle and a left side viewing angle of each of a plurality of viewing locations; repeatedly calculating, for a second curvature, a difference value between a right side viewing angle and a left side viewing angle of each of the plurality of viewing locations; determining whether to use the first curvature or the second curvature based on the difference values; and setting a curvature of the display panel based on the determination.

The method may further include determining whether to use the first curvature or the second curvature based on viewing distances between the plurality of viewing locations and a central area.

In response to a difference value corresponding to the first curvature and within a first range of the viewing distances being smaller than a difference value corresponding to the second curvature and within the first range of the viewing distances, the set curvature may be the first curvature.

In response to a difference value corresponding to the second curvature and within a second range of the viewing distances being smaller than a difference value corresponding to the first curvature and within the second range of the viewing distances, the set curvature may be the second curvature.

According to an aspect of another exemplary embodiment, there is provided an adjustable curved display including: a sensor configured to detect locations of viewers within a room; a processor configured to: calculate, for a settable first curvature, a difference value between a right side viewing angle and a left side viewing angle of each of the viewers within the room; calculate, for a second curvature, a difference value between a right side viewing angle and a left side viewing angle of each of the viewers within the room; and determine whether to use the first curvature or the second curvature based on the difference values; and wherein in response to determining to use the first curvature, the curved display adjusts to have the first curvature, and in response to determining to use the second curvature, the curved display adjusts to have the second curvature.

The adjustable curved display may also include a driving unit configured to change the curvature of the display panel according to the determination.

The process may be further configured to calculate, for each of the first and second curvatures, a sum of calculated difference values associated with each of the viewers within the room; and determine to use a curvature from among the first and second curvatures that results in a smallest sum of the differences values.

According to various exemplary embodiments, a curved display panel which enlarges a viewing angle of a viewer than a plan display panel, increases an immersion, and decreases a distortion of a viewing angle may be realized.

BRIEF DESCRIPTION OF THE DRAWINGS

FIGS. 4 to 7 are views illustrating a table and a graph which arranges difference values between a right side viewing angle and a left side viewing angle of each viewing location as changing a viewing location according to a curvature of a display panel according to an exemplary embodiment;

FIGS. 8 to 30 are views illustrating a table and a graph which arranges the sum of calculated difference values regarding a plurality of viewing locations according to a curvature of a display panel according to another exemplary embodiment;

DETAILED DESCRIPTION OF EXEMPLARY EMBODIMENTS

Figure 1:
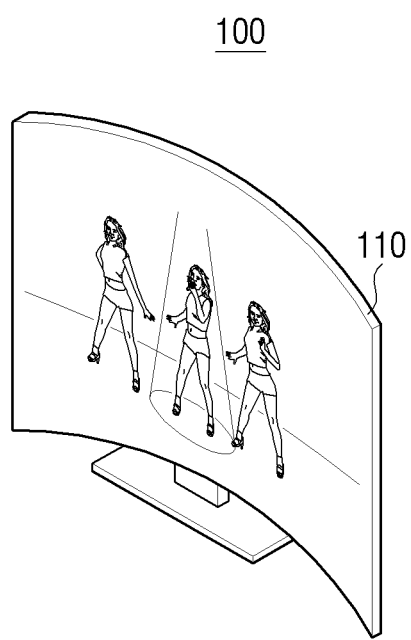
FIG. 1 is a view illustrating a display apparatus including a display panel according to an exemplary embodiment.

Hereinafter, exemplary embodiments will be described in more detail with reference to the accompanying drawings. In the following description, the same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating a display apparatus including curved display panel according to an exemplary embodiment. The curved display panel may be flexible so as to allow the curvature of the display panel to change based on the presence and location of people within the room. The curved display panel may include a sensor for detecting the location of one or more humans within a room. Based on the detected location(s) of the viewers within the room, the curved display panel can alter its curvature so as to minimize the viewing angle distortion experienced by the people within the room. This alteration of the curvature of the display panel can be achieved by a driving unit (e.g., any suitable motor) configured to curve or flatten the curved display a predetermined amount. The bezel surrounding the curved display panel may be flexible. The bezel may also be rigid and define the limits of the variable curvature.

Referring to FIG. 1, a display apparatus 100 includes a curved display panel 110. Herein, the display apparatus 100 may be realized as electronic apparatuses with various shapes such as a TV, an electronic bulletin board, an electronic table, a large format display (LFD), a smart phone, a tablet, a desktop PC, a notebook PC, and the like.

The display panel 110 has a steady curvature or curvature radius. Herein, a curvature or curvature radius is a value which indicates a degree of curve with respect to each point of a curved surface. In other words, the larger a curvature or a curvature radius, the more gradual the curve of the curved surface, and the smaller a curvature or a curvature radius, the more steep the curve of curved surface.

In this specification, a curvature and a curvature radius represent a value indicating a degree of curvature with respect to each point of a curved surface.

The viewing angle of a viewer centered in front of the curved display panel 110 is larger than the viewing angle of a viewer centered in front of a flat display panel and, therefore, the viewer using the curved display panel 110 has an increased immersion when compared to the viewer using the flat display panel. However, the viewing angle of a viewer located left or right of the curved display panel 110 is distorted.

To decrease the viewing angle distortion, a method for designing a display panel according to an exemplary embodiment is to calculate a difference value between a right side viewing angle and a left side viewing angle of a viewing location.

Figure 2:
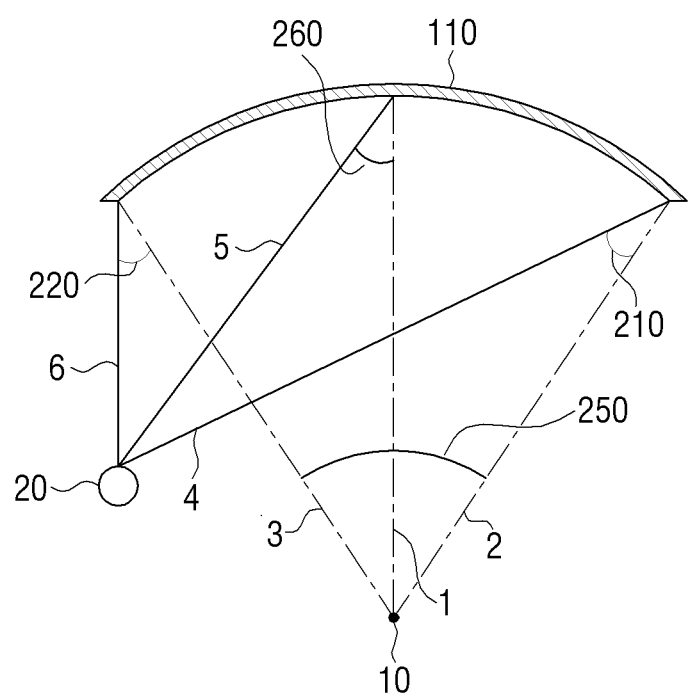
FIG. 2 is a view illustrating a right side view angle and a left side view angle used to set a curvature of a display panel according to an exemplary embodiment.

FIG. 2 is a view illustrating a left side viewing angle and a right side viewing angle used to set a curvature of a display panel according to an exemplary embodiment.

Referring to FIG. 2, the curved display panel 110 has a steady curvature so that the curved display panel 110 may correspond to a part of a circle having a single central point. Accordingly, a line 1 located in a vertical direction of a tangent of a central area of the curved display panel 110, a line 2 located in a vertical direction of a tangent of a right end of the curved display panel 110, and a line 3 located in a vertical direction of a tangent of a left end of the curved display panel 110 have an identical length of radius, and all lines 1, 2, and 3 meet at a central point 10 of a circle defining the curvature of the curved display panel 110.

Figure 3:
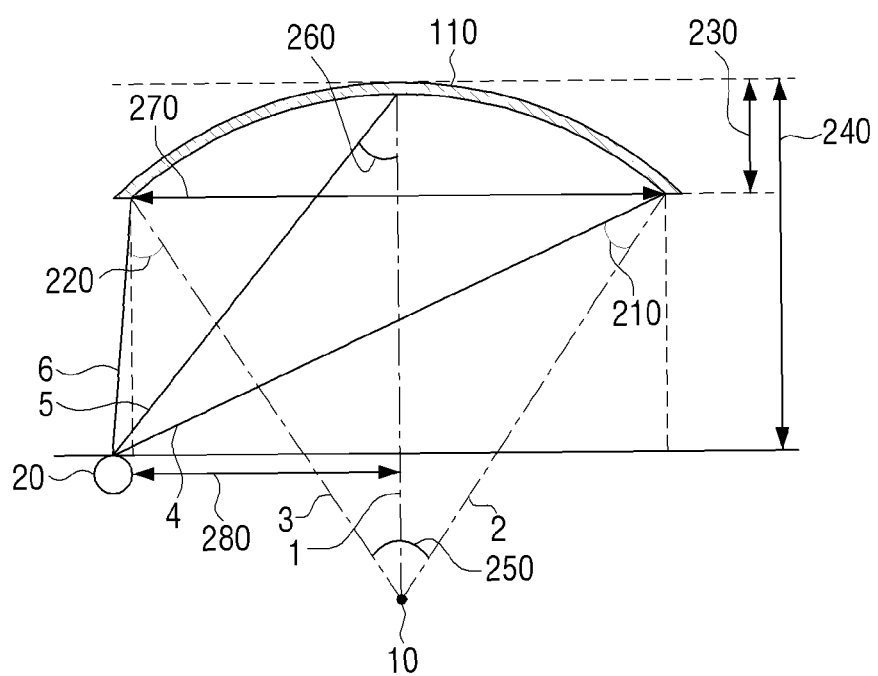
FIG. 3 is a view illustrating information used to set a curvature of a display panel according to an exemplary embodiment.

FIG. 2 also shows a viewing location 20. The viewing location 20 is a location from which a user views the curved display panel 110. Accordingly, it should be understood that the viewing location 20 is variable and the viewing location 20 shown in FIG. 3 is just an example of one viewing location. FIG. 2 also shows a right side viewing angle 210, a left side viewing angle 220, and a central viewing angle 260. The right side viewing angle 210 is an angle between a line 4, which is along a viewing direction a user viewing a right end of the curved display panel 110 from viewing location 20, and the line 2. The left side viewing angle 220 is an angle between a line 6, which is along a viewing direction of a user viewing a left end of the curved display panel 110 from viewing location 20, and the line 3. The central viewing angle 260 is an angle between a line 5, which is along a viewing direction of a user viewing a central portion of the curved display panel 110 from viewing location 20, and the line 1.

When the viewing location 20 is the central point 10, then line 1 corresponds to a central viewing direction for viewing a central area of the curved display panel 110, line 2 corresponds to a right viewing direction for viewing a right end of the curved display panel 110, and line 3 corresponds to a left viewing direction for viewing a left end of the curved display panel 110. In this case, lines 1, 2 and 3 have a same length from central point 10 to the curved display panel 110.

As described above, a method for designing a display panel according to an exemplary embodiment is to calculate a difference value between the right side viewing angle 210 and the left side viewing angle 220 from a specific viewing location. Herein, the smaller the difference in value between the right side viewing angle 210 and the left side viewing angle 220 of a specific viewing location, the less the distortion of viewing angle of the specific viewing location.

Figure 31:
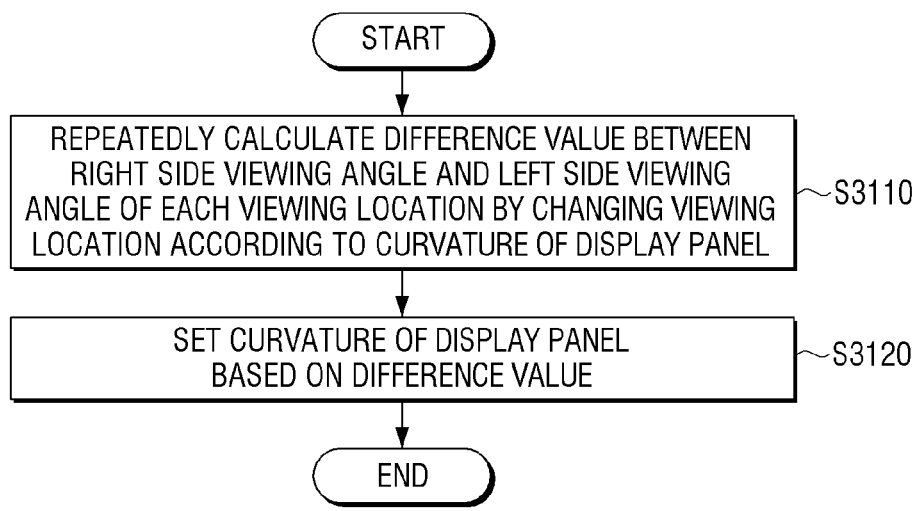
FIG. 31 is a flowchart illustrating a method for designing a display panel according to an exemplary embodiment.

Referring to FIG. 31, a flowchart explaining a method for designing a display panel is explained in detail according to an exemplary embodiment.

Referring to FIG. 31, the method includes a calculating step (S3110) and a setting step (S3120). The calculating step (S3110) includes repeatedly calculating a difference value between a right side viewing angle 210 and a left side viewing angle 220 of each viewing location by changing a viewing location according to a curvature of the curved display panel 110. The setting step (S3120) includes setting a curvature of the curved display panel 110 based on the difference value.

More specifically, the calculating step (S3110) includes repeatedly calculating a difference value between a right side viewing angle 210 and a left side viewing angle 220 of each viewing location based on an arbitrary curvature of the curved display panel 110 and an arbitrary viewing location.

The calculating step (S3110) performs a process of setting a curvature of the curved display panel 110 to a first curvature, setting a single viewing location with respect to the curved display panel 110 including the first curvature, and calculating a difference value between a right side viewing angle 210 and a left side viewing angle 220 of the set viewing location a plurality of times, and storing the results. Next the calculating step performs a processing of setting a curvature of the curved display panel 110 to a second curvature, setting a single viewing location with respect to the curved display panel 110 including the second curvature, and calculating a difference value between a right side viewing angle 210 and a left side viewing angle 220 of the set viewing location a plurality of times, and storing the results.

For example, a curvature of the curved display panel 110 is set to 4000 R, and a viewing location is changed so that a viewing distance from the curved display panel 110 is changed from 1 m to 4 m by 100 mm increments. Thus, a difference value between a right side viewing angle 210 and a left side viewing angle 220 of each viewing location may be calculated in the calculating step (S3110).

Next, the curvature of the curved display panel 110 is set to 4100 R, and a viewing location is changed so that a viewing distance from the curved display panel 110 is changed from 1 m to 4 m by 100 mm increments. Thus, a difference value between a right side viewing angle 210 and a left side viewing angle 220 of each viewing location may be calculated in the calculating step (S3110).

As described above, the calculating step (S3110) is configured to calculate a difference value between a right side viewing angle 210 and a left side viewing angle 220 based on various curvatures and various viewing locations of the curved display panel 110, and to store the result.

Now, an exemplary process of calculating a difference value between a right side viewing angle 210 and a left side viewing angle 220 of a viewing location is explained in detail.

FIG. 3 is a view illustrating information used to set a curvature of a display panel according to an exemplary embodiment.

Referring to FIG. 3, the curved display panel 110, the right side viewing angle 210, the left side viewing angle 220, a thickness 230 of the curved display panel 110, a viewing distance 240, a curvature angle 250, a viewing angle 260, a length 270 of a straight line in a width direction of the curved display panel 110, and a length 280 in a width direction from the set viewing location 20 to a central area of the curved display panel 110 are illustrated.

A process of calculating a difference value between a right side viewing angle 210 and a left side viewing angle 220 of a viewing location includes comparing a first viewing direction, which views a central area of the curved display panel 110, from a predetermined standard location with a second viewing direction, which views a central area of the curved display panel 110, from a set viewing location, and calculating a viewing angle of the set viewing location.

For example, referring to FIG. 3, the process of calculating a viewing angle includes comparing the first viewing direction 1 from the central point 10, which is the predetermined standard location, with the second viewing direction 5 from the set viewing location 20, and calculating the viewing angle 260.

A process of calculating a difference value between a right side viewing angle 210 and a left side viewing angle 220 on a viewing location includes calculating a viewing distance. The viewing distance is the length of a straight line that vertically connects a set viewing location with a plane where a central area is located.

For example, referring to FIG. 3, the viewing distance 240 may be calculated based on a straight-line distance vertically connecting a plane 230 touching the central area of the curved display panel 110 and the set viewing location 20.

The process of calculating a difference value between a right side viewing angle 210 and a left side viewing angle 220 of a viewing location includes calculating each of the right side viewing angle 210 and the left side viewing angle 220 of the set viewing location 20 using the viewing angle 260 and the viewing distance 240, and then storing the difference value between the right side viewing angle 210 and the left side viewing angle 220.

The viewing angle 260 may be calculated using an equation below.

$$\text{Viewing angle} = \tan^{-1}(S/D) \quad \text{[Equation 1]}$$

Herein, S represents a width direction length 280 from a set viewing location to a central area of the curved display panel 110, and D represents a viewing distance 240.

The viewing angle 260 may be changed according to the set viewing location 20 and the viewing distance 240. Also, the width direction length 280 from the set viewing location 20 to a central area of the curved display panel 110 is identical to a straight-line distance between the viewing distance 1 which views a central area of the curved display panel 110 on the central point 10 of a circle which is a predetermined standard location and the set viewing location 20.

The right side viewing angle 210 may be calculated using an equation below.

$$\text{Right side viewing angle} = \tan^{-1}((D^*\tan(A)+h/2)/(D-d))-a/2 \quad \text{[Equation 2]}$$

The left side viewing angle 220 may be calculated using an equation below.

$$\text{Left side viewing angle} = \tan^{-1}((D^*\tan(A)-h/2)/(D-d))+a/2 \quad \text{[Equation 3]}$$

Herein, D represents the viewing distance 240, A represents the viewing angle 260, h represents a straight-line distance 270 in a width direction of the curved display panel 110, d represents the thickness 230 of the curved display panel 110, and a represents the curvature angle 250.

The curvature angle 250, a, is an angle between the viewing direction 3 from the predetermined standard location 10 and a viewing direction 2 from predetermined standard location 10, and the curvature angle 250 may be calculated by an equation below.

$$a = \text{rad}(H/R) \quad \text{[Equation 4]}$$

Herein, H is an arc length of the curved display panel 110 from the right end to the left end of the curved display panel 110.

R is the distance from the predetermined standard location 10 to the curved display panel 110.

The arc length H of the curved display panel 110 is measured in radians and represents an arc of the curved display panel 110 that subtends the curvature angle 250. That is to say the radian measure of curvature angle 250 equals H/R.

The thickness 230 of the curved display panel 110, d, may be calculated using an equation below.

$$d = R(1-\cos(a/2)) \quad \text{[Equation 5]}$$

The thickness 230 of the curved display panel 110 may be calculated through Equation 5 using the curvature angle 250 and a curvature radius R which were calculated using Equation 4.

Also, h which is a straight-line distance 270 in a horizontal direction of the curved display panel 110 may be calculated using an equation below.

$$h = 2^*R \sin(a/2) \quad \text{[Equation 6]}$$

Herein, the straight-line distance 270 in a horizontal direction of the curved display panel 110 represents a straight-line distance between the left end and the right end of the curved display panel 110.

A right side viewing angle 210 and a left side viewing angle 220 of a viewing location is calculated, and a difference value between the calculated right side viewing angle and the left side viewing angle may be calculated using Equation 2 and Equation 3.

Referring to FIG. 31, the calculating step (S3110) is configured to change a viewing location according to a curvature of the curved display panel 110 and repeatedly calculate a difference value between a right side viewing angle 210 and a left side viewing angle 220 of each viewing location.

A method for designing a display panel according to an exemplary embodiment includes setting (S3120) a curvature of the curved display panel 110 based on a plurality of difference values calculated through the calculating step (S3110). The curvature of the curved display panel 110 is set in order to minimize viewing angle distortion.

Referring to FIGS. 4 to 7, the setting step (S3120) includes setting a curvature of the curved display panel 110 based on a curvature range and a viewing distance range where a difference value is minimized.

Figure 7:
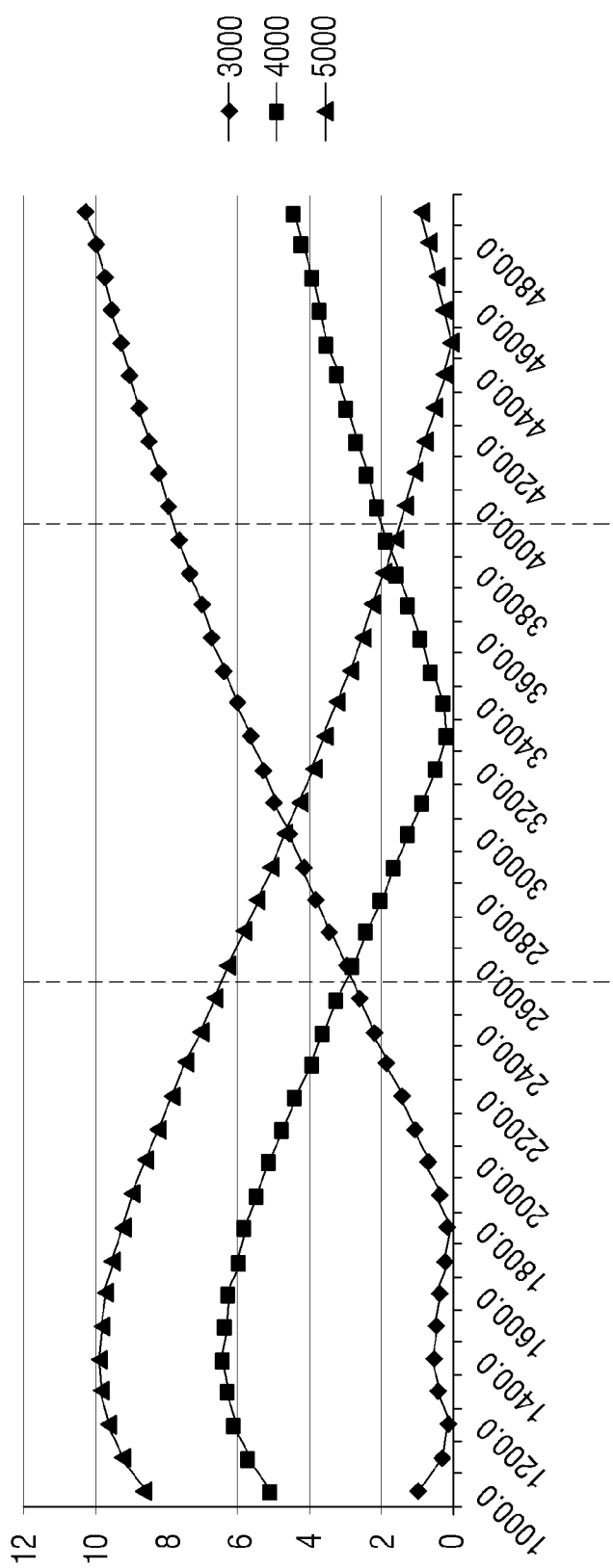

FIGS. 4-6 are a table. Referring to FIG. 4, H represents an arc length of the curved display panel 110, A represents the viewing angle 260, D represents the viewing distance 240, R represents a curvature or a curvature radius equal to lines 1, 2 and 3, a represents the curvature angle 250, d represents the thickness 230 of the curved display panel 110, h represents a straight-line distance 270 in a horizontal direction of the curved display panel 110, ① 410 represents the right side viewing angle 210, ② 420 represents a left side viewing angle 220, and a deviation 430 represents a difference value between the right side viewing value 210 and the left side viewing angle 220 which is a difference value between ① 410 and ② 420. FIG. 7 is a graph showing deviations 430 for curved display panels with different curvatures R (e.g., 3000 R, 4000 R and 5000 R).

Referring to FIG. 4, a difference value 430 between a right side viewing angle 410 and a left side viewing angle 420.

The left and right side viewing angles were calculated for a case the curved display panel is 55 inches and has a curvature of 3000 R.

FIG. 5 is a view illustrating a table where a difference value 430 between a right side viewing angle 410 and a left side viewing angle 420. The left and right side viewing angles were calculated for a case where the curved display panel 110 is 55 inches and has a curvature of 4000 R. FIG. 6 is a view illustrating a table where a difference value 430 between a right side viewing angle 410 and a left side viewing angle 420. The left and right side viewing angles were calculated for a case where the curved display panel 110 is 55 inches and has a curvature of 5000 R.

FIG. 7 is a view illustrating a graph which indicates difference values between a right side viewing angle 210 and a left side viewing angle 220 for cases where a curvature 3000 R, 4000 R, and 5000 R according to each of curvatures and viewing distance, as described in FIGS. 4 to 6.

In FIG. 7, the horizontal axis shows a viewing distance D in mm, and the vertical axis shows a size of a difference value 430.

Setting (S3120) a curvature of the curved display panel 110 is based on a curvature range and a viewing distance range where a difference value is minimized. For example, as shown in FIG. 7, when a range of viewing distance is from 2,600 mm to 4,000 mm, a curvature where a difference value is minimized is 4000 R. Thus, the designer of a curved display panel that is to be viewed at any distance from 2,600 mm to 4,000 mm would set the curvature to 4000 R in order to minimizes a distortion of a viewing angle.

Similarly, the curvature would be set to 3000 R for a case where the curved display panel is to be viewed as any distance from 1,000 mm to 2,600 mm in order to minimize a distortion of a viewing angle.

Similarly, the curvature would be set to 5000 R for a case where the curved display panel is to be viewed at any distance from 4,000 mm to 5,600 mm in order to minimize a distortion of a viewing angle.

To summarize, the setting step (S3120) includes optimizing a curvature of the curved display panel based on a desired viewing distance in order to minimize a difference value between a right side viewing angle.

The above exemplary embodiment explains calculating a curvature of the curved display panel 110 by changing a viewing distance 240 which is a vertical distance between the curved display panel 110 and a viewer based on a difference value between the right side viewing angle 210 and the left side viewing angle 220 calculated. Also, a curvature of the curved display panel 110 may be calculated by changing the width direction length 280 which is from the set viewing location 20 to a central area of the curved display panel 110 based on a difference value between the right side viewing angle 210 and the left side viewing angle 220.

A curvature of the curved display panel 110 may be calculated based on a difference value between the right side viewing angle 210 and the left side viewing angle 220 calculated by changing a viewing distance 240 and a width direction length 280. Accordingly, regardless of direction and location changes of the set viewing location 20, the right side viewing angle 210 and the left side viewing angle 220 regarding each viewing location may be calculated, and a curvature of the curved display panel 110 may be calculated based on a difference value between the right side viewing angle 210 and the left side viewing angle 220.

According to another exemplary embodiment, setting (S3120) a curvature of a display panel is achieved by calculating the sum of calculated difference values regarding a plurality of viewing locations according to each of curvatures, and setting a curvature where the sum of different values is minimized to a curvature of the curved display panel.

In other words, when a plurality of viewers watches the curved display panel 110 from a plurality of viewing locations, the setting (S3120) of a curvature of a display panel to minimize a distortion of a viewing angle on a plurality of viewing locations is achieved by setting a curvature where the sum of difference values is minimized to an optimum curvature of the curved display panel by calculating the sum of calculated difference values each associated with a different one of the plurality of viewing locations according to each of the curvatures. Accordingly, a distortion of a viewing angle of a plurality of viewing locations which exist on a predetermined area may be minimized. Referring to FIGS. 8 to 30, a process of calculating is explained specifically.

The meaning of the column headers H, A, D, R, a, d, h, ①, ②, and deviation was already explained and, therefore, a redundant explanation is omitted. Meanwhile, "s" represents the width direction length 280 which is from the set viewing location 20 to a central area of the curved display panel 110 as described in FIG. 3. In FIGS. 8 to 29 the width direction length s is set to 1,500 mm.

FIGS. 8 to 30 are views illustrating a table and a graph where calculated difference values regarding a plurality of viewing locations according to a curvature of the curved display panel.

Referring to FIG. 8, the sum 810 of difference values 430 for each viewing distance from 3,000 mm to 4,000 mm is calculated for a case where the curved display panel 110 is 55 inches and has a curvature of 3000 R. As shown in FIG. 8 the sum 810 has a value of 70.

FIG. 9 is a view illustrating a table where the sum 810 of difference values 430 for each viewing distance from 3,000 mm to 4,000 mm is calculated for a case where the curved display panel 110 is 55 inches and has a curvature of 3100 R. Referring to FIG. 9, the sum 810 of difference values 430 of each viewing distance is 61.

Likewise, FIGS. 10 to 28 are views illustrating a table where the sum 810 of difference values 430 between a right side viewing angle 410 and a left side viewing angle 420 for each viewing distance D from 3,000 mm to 4,000 mm for a case where the curved display panel 110 is 55 inches and has a curvature of 3200 R, 3300 R, 3400 R, 3500 R, 3600 R, 3700 R, 3800 R, 3900 R, 4000 R, 4100 R, 4200 R, 4300 R, 4400 R, 4500 R, 4600 R, 4700 R, 4800 R, 4900 R and 5000 R, respectively.

Figure 30:
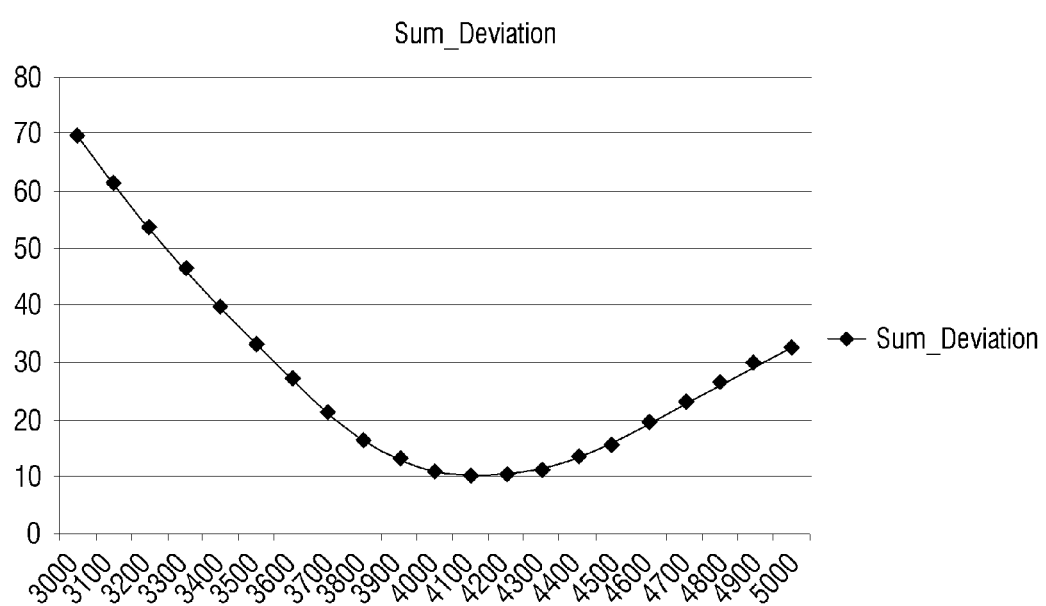

FIG. 29 a table that summarizes the tables shown in FIGS. 8 to 28. For each curvature from 3000 R to 5000 R the respective deviation sum is shown. FIG. 30 is graph of the table shown in FIG. 29, where the horizontal axis shows a curvature of the curved display panel 110 and the vertical axis shows the sum of difference values for a corresponding curvature.

When the viewing distance D ranges from 3,000 mm to 4,000 mm, a curvature where the sum of difference values is minimized is 4100 R or 4200 R. Therefore, in this case, at the setting step (S3120) a designer of the curved display panel would optimize a curvature to be 4100 R or 4200 in order to minimize distortion of a viewing angle from a plurality of viewing locations.

Referring to FIGS. 8 to 30, setting (S3120) a curvature of a display panel is explained as calculating the sum of difference values, but it is not limited to calculating the sum of difference values. An average of difference values may be calculated, and an optimum curvature may be set by calculating a standard deviation.

Furthermore, a curvature of the curved display panel 110 may be calculated based on the sum of difference values between a right side viewing angle 210 and a left side viewing angle 220 calculated by changing the width direction length s (280) from the set viewing location 20 to a central area of the curved display panel.

A curvature of the curved display panel 110 may be calculated based on the sum of difference values between a right side viewing angle 210 and a left side viewing angle 220 by changing a viewing distance D (240) and the width direction length s (280). Accordingly, regardless of location or direction changes of the set viewing location 20, the right side viewing angle 210 and the left side viewing angle 220 regarding each set viewing location 20 may be calculated, and a curvature of the curved display panel 110 may be calculated based on a difference value between the right side viewing angle 210 and the left side viewing angle 220.

According to another exemplary embodiment, setting (S3120) a curvature of a display panel may include calculating a first difference value between a right side viewing angle and a left side viewing angle of a specific viewing location regarding a flat panel display, calculating a second difference value between a right side viewing angle and a left side viewing angle of a specific viewing location regarding a curved display panel, calculating a third difference value between the first and second difference values and setting a curvature of the curved display panel based on the third difference value.

Setting (S3120) a curvature of a display panel may include setting, as an optimum a curvature of the curved display panel, a curvature corresponding to a maximum third difference value.

Accordingly, a display panel with an optimum curvature that minimizes viewing angle distortion for each viewing location of at least one viewer may be designed and manufactured by the above-mentioned method of designing the curved display panel.

A recording medium according to an exemplary embodiment stores a program which designs a display panel. The recording medium may be a non-transitory recording medium.

Herein, a program which designs a display panel may consecutively perform a step of repeatedly calculating a difference value between a right side viewing angle and a left side viewing angle on each viewing location by changing a viewing location according to a curvature of the curved display panel and a step of setting a curvature of the curved display panel based on the difference value.

The curvature of the curved display panel may be set based on a curvature range and a viewing distance range that minimize a difference value. Herein, the features explained in FIGS. 4 to 7 may be applied identically to the step of setting a curvature of the curved display panel.

The curvature of the display panel may be set by calculating the sum of calculated difference values regarding a plurality of viewing locations according to each curvature. The curvature whose sum of difference values is the smallest is then used as the set curvature. Herein, the feature explained in FIGS. 8 to 30 may be applied identically to the step of setting a curvature of the curved display panel.

Figure 32:
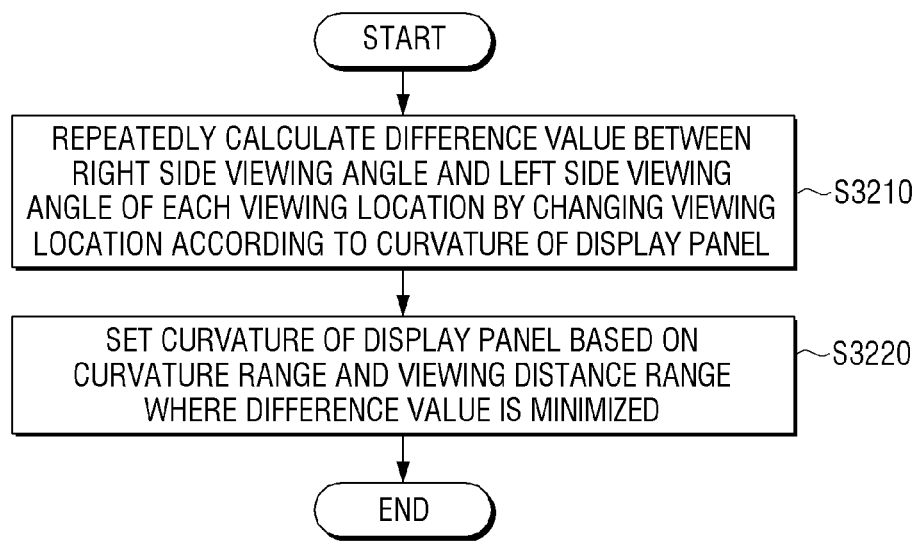
FIG. 32 is a flowchart illustrating a method for setting a curvature of a display panel according to an exemplary embodiment.

FIG. 32 is a flowchart illustrating a method for setting a curvature of a display panel according to an exemplary embodiment.

According to the method illustrated in FIG. 32, a difference value between a right side viewing angle and a left side viewing angle from each viewing location may be repeatedly calculated by changing the viewing location according to a curvature of the curved display panel (S3210).

Afterward, the curvature of the display panel may be set based on a curvature range and a viewing distance range that results in a smallest difference value (S3220).

Figure 33:
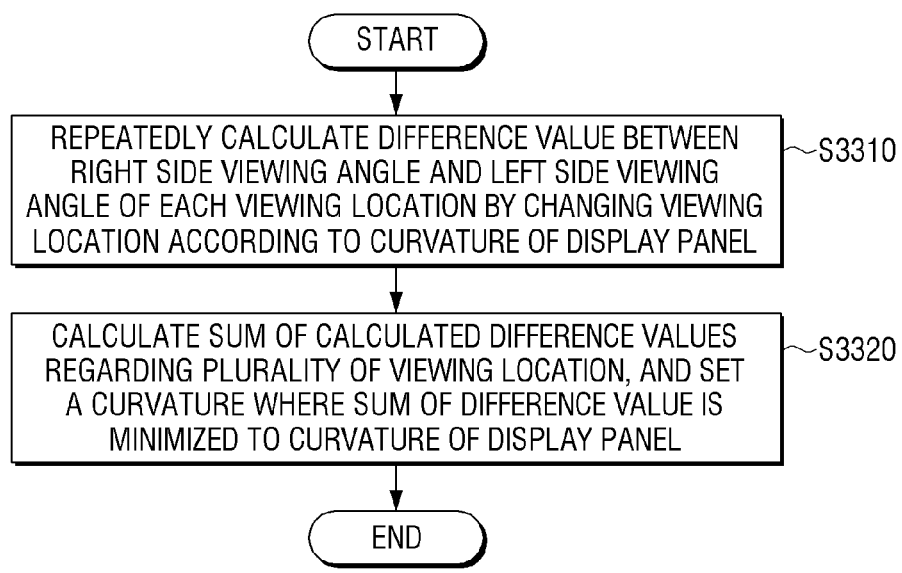
FIG. 33 is a flowchart illustrating a method for setting a curvature of a display panel according to another exemplary embodiment.

FIG. 33 is a flowchart illustrating a method for setting a curvature of a display panel according to another exemplary embodiment.

According to a method illustrated in FIG. 33, a difference value between a right side viewing angle and a left side viewing angle from each viewing location may be repeatedly calculated by changing the viewing location according to the curvature of the display panel (S3310).

Afterward, the sum of calculated difference values regarding a plurality of viewing locations may be calculated according to each of curvature. Also, a curvature resulting in a smallest sum of difference values is set as the curvature of the display panel (S3320).

The display apparatus 100 according to an exemplary embodiment may include a sensor (not illustrated) which deducts a viewing location of a viewer and the number of viewers, a controller (not illustrated) which calculates a curvature based on a viewing location and the number of viewers deducted from the sensor (not illustrated), and a driving unit (not illustrated) which changes a curvature of display panel based on the calculated curvature.

The sensor may be embodied as any sensor that is able to detect the presence of a human such as, a passive infra-red sensor, a camera sensor, a thermal sensor, etc.

The controller (not illustrated) may repeatedly calculate a difference value between a right side viewing angle and a left side viewing angle of each viewing location based on the deducted viewing location of a viewer and the number of viewers.

To be specific, the controller (not illustrated) may set the curvature of the display panel so that the difference value is minimized, and set the curvature of the display panel so that the sum of calculated difference values regarding a plurality of viewing locations is minimized.

The driving unit (not illustrated) may drive at least one curvature variable unit (not illustrated) equipped on a display panel to correspond to a curvature calculated in the controller (not illustrated).

A non-transitory computer readable medium which stores a program performing a controlling method consequently according to an exemplary embodiment may be provided.

For example, a non-transitory computer readable medium which stores a program performing a step of repeatedly calculating a difference value between a right side viewing angle and a left side viewing angle of each viewing location by changing a viewing location according to a curvature of a display panel and a step of setting a curvature of a display panel based on a difference value may be provided.

The non-transitory readable medium means a medium which stores a data semi-permanently and is readable by an apparatus, not a media which stores a data for a short period such as a register, a cache, a memory and so on. Specifically, a CD, a DVD, a hard disk, a Blu-ray disk, a USB, a memory card and ROM may be the non-transitory readable medium.

Desirable exemplary embodiments of the present disclosure were illustrated and explained above, but the present disclosure is not limited to the described exemplary embodiments. Also, the description of the exemplary embodiments of the present disclosure is intended to be illustrative, and not to limit the scope of the claims, and it would be appreciated by those skilled in the art that changes may be made to the exemplary embodiments without departing from the principles and spirit of the disclosure, the scope of which is defined in the appended claims.

What is claimed is:

1. A method for designing a display panel, the method comprising:

calculating, for each of a plurality of viewing locations, a difference value between a right side viewing angle of a viewing location and a left side viewing angle of the viewing location, the calculating being performed for each of a plurality of curvatures; and setting, among the plurality of curvatures, a curvature of the display panel based on the difference value for each of the plurality of viewing locations, wherein a shape of the display panel is changed to have the set curvature, wherein the right side viewing angle is an angle between a first line along a viewing direction of a user viewing a right end of the display panel from the viewing location, and a second line from a central point to the right end of the display panel, and wherein the left side viewing angle is an angle between a third line along a viewing direction of the user viewing a left end of the display panel from the viewing location, and a fourth line from the central point to the left end of the display panel.

2. The method as claimed in claim 1, wherein the setting comprises setting, among the plurality of curvatures, the curvature based on a curvature range and a viewing distance range resulting in a smallest difference value.

3. The method as claimed in claim 1, wherein the setting comprises:

calculating, for each of the plurality of curvatures, a sum of calculated difference values of each of the plurality of viewing locations; and setting, among the curvatures, the curvature of the display panel to a curvature resulting in the smallest sum of the differences values.

4. The method as claimed in claim 1, wherein the calculating comprises:

setting the curvature of the display panel to a first curvature;

repeating a process of:

setting a viewing location for viewing the display panel set to the first curvature;

calculating a difference value between a right side viewing angle and a left side viewing angle of the set viewing location a plurality of times; and storing a result of the calculation;

setting the curvature of the display panel to a second curvature; and repeating a process of:

setting a viewing location for viewing the display panel set to the second curvature;

calculating a difference value between a right side viewing angle and a left side viewing angle of the set viewing location a plurality of times; and storing a result of the calculation.

5. The method as claimed in claim 1, wherein the calculating comprises:

calculating a central viewing angle between a first viewing direction from a predetermined standard location toward a central area of the display panel and a second viewing direction from the viewing location toward the central area;

calculating a viewing distance connecting a first plane where the central area is located and a second plane where the viewing location is located, the first plane and the second plane being parallel, the viewing distance being a shortest distance between the first and second planes;

calculating each of the right side viewing angle and the left side viewing angle of the viewing location using the central viewing angle and the viewing distance; and calculating and storing the difference value between the right side viewing angle and the left side viewing angle.

6. The method as claimed in claim 5, wherein the central viewing angle is calculated as follows:

Viewing angle=$\tan^{-1}(S/D)$, and wherein S represents a width direction distance along the second plane from the viewing location to the central area of the display panel, and D represents the viewing distance.

7. The method as claimed in claim 1, wherein the right side viewing angle is calculated as follows:

Right side viewing angle=$\tan^{-1}((D^*\tan(A)+h/2)/(D-d))-a/2$, wherein the left side viewing angle is calculated as follows:

Left side viewing angle=$\tan^{-1}((D^*\tan(A)-h/2)/(D-d))+a/2$, and wherein D represents a viewing distance connecting a first plane where a central area of the display panel is located and a second plane where the viewing location is located, the first plane and the second plane being parallel, the viewing distance being a shortest distance between the first and second planes, A represents a viewing angle between a first viewing direction from a predetermined standard location toward the central area and a second viewing direction from the viewing location toward the central area, h represents a width direction distance of the display panel in a straight line, d represents a distance along a third plane that is orthogonal to the first plane and between the central area and an outside edge of the display panel, and a represents an angle between a third viewing direction from the predetermined standard location toward the right end of the display panel and a fourth viewing direction from the predetermined standard location toward the left end of the display panel.

8. A display panel manufactured by a design method according to claim 1.

9. The method as claimed in claim 1, wherein the difference value is a deviation between a right side viewing angle of a set viewing location and a left side viewing angle of the set viewing location.

10. The method as claimed in claim 1, wherein the shape of the display panel is physically changed to have the set curvature.

11. A non-transitory computer readable medium storing a program that is executed for performing a method for designing a display panel, the method comprising:

calculating, for each of a plurality of viewing locations, a difference value between a right side viewing angle of a viewing location and a left side viewing angle of the viewing location, the calculating being performed for each of a plurality of curvatures; and setting, among the plurality of curvatures, a curvature of the display panel based on the difference value for each of the plurality of viewing locations, wherein a shape of the display panel is changed to have the set curvature, wherein the right side viewing angle is an angle between a first line along a viewing direction of a user viewing a right end of the display panel from the viewing location, and a second line from a central point to the right end of the display panel, and wherein the left side viewing angle is an angle between a third line along a viewing direction of the user viewing a left end of the display panel from the viewing location, and a fourth line from the central point to the left end of the display panel.

12. The non-transitory computer readable medium as claimed in claim 11, wherein the setting comprises setting, among the plurality of curvatures, the curvature based on a curvature range and a viewing distance range resulting in a smallest difference value.

13. The non-transitory computer readable medium as claimed in claim 11, wherein the setting comprises:
calculating, for each of the plurality of curvatures, a sum of calculated difference values of each of the plurality of viewing locations; and
setting, among the curvatures, the curvature of the display panel to a curvature resulting in the smallest sum of the differences values.

14. A method for designing a display panel, the method comprising:
repeatedly calculating, for a first curvature, a difference value between a right side viewing angle and a left side viewing angle of each of a plurality of viewing locations;
repeatedly calculating, for a second curvature, a difference value between a right side viewing angle and a left side viewing angle of each of the plurality of viewing locations;
determining whether to use the first curvature or the second curvature based on the difference values; and
setting a curvature of the display panel based on the determination,
wherein a shape of the display panel is changed to have the set curvature,
wherein the right side viewing angle is an angle between a first line along a viewing direction of a user viewing a right end of the display panel from the viewing location, and a second line from a central point to the right end of the display panel, and
wherein the left side viewing angle is an angle between a third line along a viewing direction of the user viewing a left end of the display panel from the viewing location, and a fourth line from the central point to the left end of the display panel.

15. The method according to claim 14, further comprising determining whether to use the first curvature or the second curvature based on viewing distances between the plurality of viewing locations and a central area.

16. The method according to claim 15, wherein the determining comprises, in response to a difference value corresponding to the first curvature and within a first range of the viewing distances being smaller than a difference value corresponding to the second curvature and within the first range of the viewing distances, determining to use the first curvature.

17. The method according to claim 16, wherein the determining comprises, in response to a difference value corresponding to the second curvature and within a second range of the viewing distances being smaller than a difference value corresponding to the first curvature and within the second range of the viewing distances, determining to use the second curvature.

18. A display apparatus comprising:
a display panel,
wherein the display apparatus is configured to:
detect locations of viewers within a room;
calculate, for a settable first curvature, a difference value between a right side viewing angle and a left side viewing angle of each of the viewers within the room;
calculate, for a settable second curvature, a difference value between a right side viewing angle and a left side viewing angle of each of the viewers within the room;
determine whether to use the first curvature or the second curvature based on the difference values;
in response to the determining to use the first curvature, adjust the display panel to have the first curvature; and
in response to the determining to use the second curvature, adjust the display panel to have the second curvature,
wherein the right side viewing angle is an angle between a first line along a viewing direction of a user viewing a right end of the display panel from a viewing location, and a second line from a central point to the right end of the display panel, and
wherein the left side viewing angle is an angle between a third line along a viewing direction of the user viewing a left end of the display panel from the viewing location, and a fourth line from the central point to the left end of the display panel.

19. The display apparatus according to claim 18, wherein the display apparatus is further configured to:
calculate, for each of the first and second curvatures, a sum of calculated difference values of each of the viewers within the room; and
determine to use a curvature among the first and second curvatures resulting in the smallest sum of the differences values.

20. A non-transitory computer readable medium storing a program that is executed for performing a method for designing a display panel, the method comprising:
repeatedly calculating, for a first curvature, a difference value between a right side viewing angle and a left side viewing angle of each of a plurality of viewing locations;
repeatedly calculating, for a second curvature, a difference value between a right side viewing angle and a left side viewing angle of each of the plurality of viewing locations;
determining whether to use the first curvature or the second curvature based on the difference values; and
setting a curvature of the display panel based on the determination,
wherein a shape of the display panel is changed to have the set curvature,
wherein the right side viewing angle is an angle between a first line along a viewing direction of a user viewing a right end of the display panel from the viewing location, and a second line from a central point to the right end of the display panel, and
wherein the left side viewing angle is an angle between a third line along a viewing direction of the user viewing a left end of the display panel from the viewing location, and a fourth line from the central point to the left end of the display panel.

\* \* \* \* \*